United States Patent
Cao et al.

(10) Patent No.: US 9,635,134 B2
(45) Date of Patent: Apr. 25, 2017

(54) RESOURCE MANAGEMENT IN A CLOUD COMPUTING ENVIRONMENT

(75) Inventors: Junwei Cao, Beijing (CN); Yuxin Wan, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 156 days.

(21) Appl. No.: 14/000,377

(22) PCT Filed: Jul. 3, 2012

(86) PCT No.: PCT/CN2012/078095
§ 371 (c)(1),
(2), (4) Date: Aug. 19, 2013

(87) PCT Pub. No.: WO2014/005277
PCT Pub. Date: Jan. 9, 2014

(65) Prior Publication Data
US 2014/0244843 A1    Aug. 28, 2014

(51) Int. Cl.
*G06F 15/173* (2006.01)
*H04L 29/08* (2006.01)
*G06F 9/50* (2006.01)

(52) U.S. Cl.
CPC .......... *H04L 67/322* (2013.01); *G06F 9/5088* (2013.01); *G06F 2209/5022* (2013.01)

(58) Field of Classification Search
CPC ..... H04L 67/322; H04L 29/08; G06F 9/5088; G06F 2209/5022

USPC .......................................... 709/226; 718/104
See application file for complete search history.

(56) References Cited

U.S. PATENT DOCUMENTS

| | | |
|---|---|---|
| 2005/0262504 A1* | 11/2005 | Esfahany et al. .................. 718/1 |
| 2007/0079308 A1* | 4/2007 | Chiaramonte et al. ........... 718/1 |
| 2011/0289555 A1 | 11/2011 | DeKoenigsberg et al. |
| 2012/0089784 A1 | 4/2012 | Surtani et al. |
| 2012/0166644 A1* | 6/2012 | Liu et al. ....................... 709/226 |
| 2013/0263117 A1* | 10/2013 | Konik et al. ...................... 718/1 |

FOREIGN PATENT DOCUMENTS

CN        102156665 A      8/2011

OTHER PUBLICATIONS

International Search Report and Written Opinion from International Application No. PCT/CN12/078095 mailed Apr. 4, 2013.
"Virtual Machine Migration Technology to Ramble, Part I", 2010, http://www.ibm.com/developerworks/cn/linux/l-cn-mgrtvm1/index.html?ca=drs.
"LIRS: An Efficient Low Inter-Reference Recency Set Replacement Policy to Improve Buffer Cache Performance" by Song Jiang, et al., Proceedings of the 2002 ACM Sigmetrics International Conference on Measurement and Modeling of Computer Systems.
"Multi-Tiered On-Demand Resource Scheduling for VM-Based Data Center", Song, et al, 2009 9th IEEE, pp. 148-155.

(Continued)

*Primary Examiner* — Cheikh Ndiaye
(74) *Attorney, Agent, or Firm* — Brundidge & Stanger, P.C.

(57) ABSTRACT

Technologies and implementations for managing cloud resources.

18 Claims, 6 Drawing Sheets

(56) References Cited

OTHER PUBLICATIONS

"An Open Source Solution for Virtual Infrastructure Management in Private and Hybrid Clouds" by B. Sotomayor, et al., IEEE Internet Computing, Special Issue on Cloud Computing, 2009, pp. 1-11.
"Integrating Public Clouds with OpenNebula for Cloudbursting", White Paper, 2010, 2 pages.
Griffin, D., and Jones, T., "Cloud Security: Safely Sharing IT Solutions," accessed at http://web.archive.org/web/20120610202828/http://technet.microsoft.com/en-us/magazine/gg296364.aspx, pp. 1-8, Jun. 10, 2012.
Kleiminger, W., et al., "Balancing Load in Stream Processing with the Cloud," 2011 IEEE 27th International Conference on Department of Computing Data Engineering Workshops (ICDEW), pp. 1-6 (Apr. 11-16, 2011).
Stephanie, "Mitigating the Risk of Cloud Services Failure: How to Avoid Getting Amazon-ed," accessed at http://web.archive.org/web/20120316212321/http://www.cio.com/article/680377/Mitigating_the_Risk_of_Cloud_Services_Failure_How_to_Avoid_Getting_Amazon_ed, posted on Apr. 25, 2011, pp. 1-4.
Zhang, H., et al., "Intelligent Workload Factoring for a Hybrid Cloud Computing Model," 2009 World Conference on Services—I, pp. 1-9 (Jul. 6-10, 2009).

\* cited by examiner

Fig. 1

LRU-VM

ΔLRU-VM

500 A computer program product

502 A signal bearing medium

504 A machine-readable non-transitory medium having stored therein instructions that, when executed by one or more processors, operatively enable a cloud computing resource manager to:

determine a consumption rate of cloud resources by one or more virtual machines (VMs);

prioritize the one or more VMs for consumption of the cloud resources using a first resource management scheme based, at least in part, on the determined consumption rate;

detect a change in the consumption rate of the cloud resources; and     prioritize the one or more VMs for consumption of the cloud resources using a second resource management scheme based, at least in part, on the detected change in the consumption rate of the cloud resources.

| 506 a computer-readable medium | 508 a recordable medium | 510 a communications medium |

RESOURCE MANAGEMENT IN A CLOUD COMPUTING ENVIRONMENT

CROSS-REFERENCE TO RELATED APPLICATION

The present application is a U.S. national stage filing under 35 U.S.C. §371 of International Application No. PCT/CN12/78095, filed on Jul. 3, 2012. The disclosure of the International Application is hereby incorporated by reference in its entirety.

BACKGROUND

Unless otherwise indicated herein, the approaches described in this section are not prior art to the claims in this application and are not admitted to be prior art by inclusion in this section.

A cloud computing environment may include shared resources such as processor resources, memory resources, storage resources, and so forth. The shared resources may be capable of being utilized by virtual machines (VMs) within the cloud computing environment providing interaction with various client devices. The shared resources may be limited, and accordingly, the VMs may vie with each other to utilize the shared resources. In general, it may be difficult to determine which VMs may have priority over another.

SUMMARY

In various embodiments, the present disclosure describes example methods for managing resources in a cloud computing environment. Example methods may include determining a consumption rate of cloud resources by one or more virtual machines (VMs) and prioritizing the one or more VMs for consumption of the cloud resources using a first resource management scheme based, at least in part, on the determined consumption rate. The example method may also include detecting a change in the consumption rate of the cloud resources and prioritizing the one or more VMs for consumption of the cloud resources using a second resource management scheme based, at least in part, on the detected change in the consumption rate of the cloud resources.

In various embodiments, the present disclosure also describes example machine-readable non-transitory media. Example machine-readable non-transitory media may include instructions that, when executed, operatively enable a cloud computing resource manager to determine a consumption rate of cloud resources by one or more virtual machines (VMs) and prioritize the one or more VMs for consumption of the cloud resources using a first resource management scheme based, at least in part, on the determined consumption rate. The example machine-readable non-transitory media may also include instructions that, when executed, operatively enable the cloud computing resource manager to detect a change in the consumption rate of the cloud resources and prioritize the one or more VMs for consumption of the cloud resources using a second resource management scheme based, at least in part, on the detected change in the consumption rate of the cloud resources.

In various embodiments, the present disclosure also describes example systems. Example systems may include a processor, a cloud computing resource manager, and a machine-readable non-transitory medium having stored therein instructions that, when executed by the processor, operatively enable the cloud computing resource manager to determine a consumption rate of cloud resources by one or more virtual machines (VMs) and prioritize the one or more VMs for consumption of the cloud resources using a first resource management scheme based, at least in part, on the determined consumption rate. The example systems may also include instructions that, when executed by the processor, operatively enable the cloud computing resource manager to detect a change in the consumption rate of the cloud resources and prioritize the one or more VMs for consumption of the cloud resources using a second resource management scheme based, at least in part, on the detected change in the consumption rate of the cloud resources.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, systems and computer-readable media related to managing resources in a cloud computing environment.

In general, a cloud computing environment (cloud) may provide for sharing of resources by virtualization. For example, one or more virtual machines (VMs) may utilize shared resources such as processing resources, memory resources, storage resources, and so forth, and these resources may be limited. As VMs vie for resources, a maximum capacity for utilization of resources may be reached for a given cloud, which may have a negative affect on a quality of service (QoS) provided by the cloud to users of the cloud.

In general, a resource may be any type of device, component, computer program product, and/or peripheral associated with a computing environment. Some example resources may include processor resources, storage resources, network resources, infrastructure resources, and/or device resources. Some example processor resources may include central processing unit (CPU) type resources, graphics processing unit (GPU) type resources, co-processor type resources, and/or any device(s) configured to operate on data. Some example memory resources may include random access memory (RAM) type resources, read only memory (ROM) type resources, virtual memory type resources, which may be mapped onto any variety of physical memory, core memory type resources, non-volatile memory type resources, etc. Some example storage resources may include hard disk drive (HDD) type resources, solid-state drive (SSD) type resources, flash memory type resources, tape drive type resources, optical drive type resources, punch card type resources, etc. Some example network resources may include network interface card (NIC) type resources, various modem type resources, Ethernet type resources, local area network (LAN) type resources, wide area network (WAN) type resources, etc., which may include wired and/or wireless based networking resources. Some example infrastructure type resources may include access to electrical power, cooling, proximity, etc. Some example device type resources may include a wide variety of displays, input devices such as mice and keyboards, speakers, etc. Some example resources may be described using multiple of the above-described example resources such as, but not limited to, a network attached storage may be a storage resource, a network resource, and/or a processor resource configured to operate on data.

Some resources may be limited in availability and may have a maximum capacity of use. Accordingly, proper management of resources may help to improve QoS of services provide by the cloud.

For example, several VMs may vie for utilization of processor resources and/or memory resources of a cloud, where each of the VMs may seek priority to utilize the resources. For example, a VM may want to execute a data intensive program such as, but not limited to, Wolfram's Mathematica. However, executing such a data intensive program in the cloud may consume a large amount of the cloud's resources that a maximum capacity for utilization of the resources may be reached, thus having a negative affect on the QoS by the cloud for a user. In order to reduce the negative affect, the VM wanting to execute such a data intensive program may be migrated, where the resources utilized by the VM may be located outside the cloud. In general, embodiments discussed herein may provide for managing resources in a cloud computing environment such that consumption rates of cloud resources may be monitored and managed. Consumption rates of the cloud resources may be based on utilization of the cloud resources by VMs. In some examples, utilization of the cloud resources by VMs may be prioritized using one resource management scheme. As consumption rates are monitored, utilization of the cloud resources by VMs may be prioritized using another resource management scheme such that two different resource management schemes may be used for prioritizing utilization of cloud resources by VMs including migration of one or more VMs. Utilization of two different resource management schemes may help to improve cloud resource management.

Figure 1:
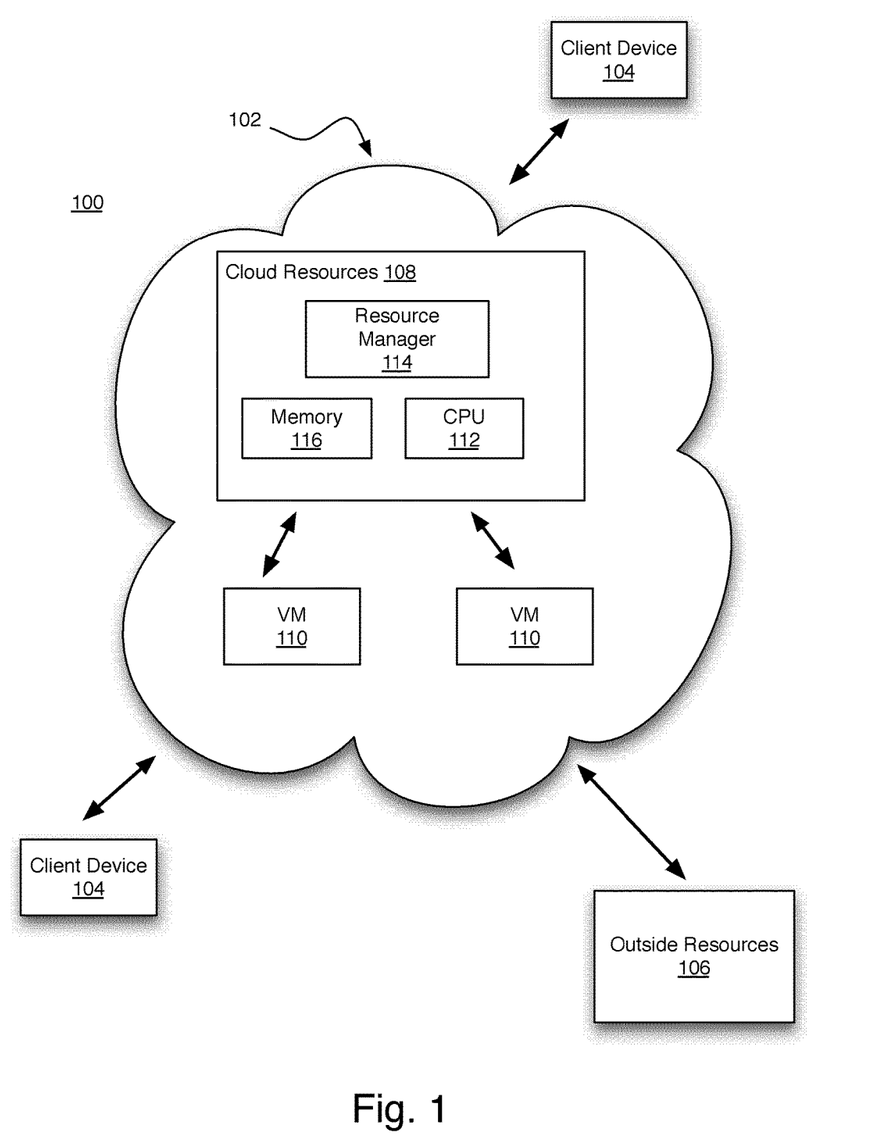
FIG. 1 illustrates a block diagram of an example system for managing resources in a cloud computing environment.

FIG. 1 illustrates a block diagram of an example system 100 for managing resources in a cloud, arranged in accordance with at least some embodiments of the present disclosure. As shown, system 100 may include a cloud 102, one or more client devices 104, and outside resources 106. Cloud 102 may include cloud resources 108 and one or more VMs 110. Cloud resources 108 may include a memory resource 116, a processor resource (CPU) 112, and a cloud computing resource manager (resource manager) 114. For purposes of illustration, components of system 100 may be communicatively coupled to each other such that cloud 102 may be communicatively coupled to outside resources 106 and to one or more client devices 104. Additionally, VMs 110 may be communicatively coupled to cloud resources 108.

In general, cloud 102 may be any type of ubiquitous type of computing environment, where various cloud services may be provided to any number of users (not shown) such as, but not limited to, platform as a service (PaaS), software as a service (SaaS), infrastructure as a service (IaaS), and/or so forth. In some examples, cloud 102 may include computers, servers, server systems, data storage systems, telecommunications systems, computing clusters, various networks, and/or ancillary environmental systems, or the like. In some examples, cloud 102 may be a public cloud, a community cloud, a private cloud, a hybrid cloud, a node on the Internet, virtual private networks (VPNs) and/or so forth. In some examples, cloud 102 may include virtualization technology, where physical computers may be implemented as one or more VMs 110.

In general, one or more VMs 110 may be any type of software implementation of a machine capable of executing programs/instructions. In some examples, one or more VMs 110 may include hardware virtualization VMs, process virtualization VMs, emulation virtualization VMs, and so forth or any combination thereof. In some examples, cloud 102 may include cloud resources 108, which may be utilized by one or more VMs 110 for executing programs/instructions.

In general, cloud resources 108 may include any type of resources suitable to be utilized by one or more VMs 110. In some examples, cloud resources may include memory resources 116, CPU resources 112, and/or resource manager 114. In some examples, cloud resources may include storage resources, firewall resources, network resources, load balancers, and/or so forth. As previously described, CPU resource 112 may be any type of processor resource, and accordingly, may be interchangeably used, and the claimed subject matter is not limited in these respects.

As show, in some examples, cloud 102 may be communicatively coupled to one or more client devices 104 and outside resources 106. In general, one or more client devices 104 may include any type of client devices such as, but not limited to, desktop type computing devices, notebook type computing devices, netbook type computing devices, mobile phone type devices, and/or so forth. As previously described with respect to cloud resources 108, in general outside resources 106 may include any type of resources suitable to be utilized by one or more VMs 110. In some examples, outside resources may be included in another ubiquitous type computing environment separate from cloud 102. In some examples, outside resources 106 may be included in computers, servers, server systems, data storage systems, telecommunications systems, computing clusters, various networks, and/or ancillary environmental systems, or the like. In some examples, outside resources 106 may be included in public cloud, community cloud, private cloud, hybrid cloud, a node on the Internet, virtual private networks (VPNs) and/or so forth.

As shown, components of system 100 may be communicatively coupled to each other such that cloud 102 may be communicatively coupled to outside resources 106 and to one or more client devices 104, and one or more VMs 110 may be communicatively coupled to cloud resources 108. In general, components of system 100 may be communicatively coupled in any suitable manner. In some examples, components of system 100 may be communicatively coupled by wire and/or wirelessly via the Internet.

As will be discussed in further detail, in some examples, resource manager 114 may facilitate resource management for cloud 102 including migration of one or more VMs (i.e., one or more VMs 110 may utilize outside resources 106). For example, resource manager 114 may determine a consumption rate of cloud resources 108 by one or more VMs 110. Based, at least in part, on the determined consumption rate, cloud resource manager 114 may prioritize one or more VMs 110 for consumption of cloud resources 108 using a first resource management scheme. Additionally, a change in consumption rate may be detected, and based, at least in part, on the detected change, resource manager 114 may prioritize one or more VMs 110 for consumption of cloud resources 108 using a second resource management scheme.

In some examples, resource manager 114 may determine a consumption rate by monitoring at least one of CPU usage 112, memory usage 116, or input/output (I/O) access rates. In general, I/O access rates may include any I/O access rates, where various components in system 100 may be in communication with each other. In some examples, I/O access rates may include I/O access rates for one or more VMs 110 within cloud 102. In general, first resource management scheme may be any resource management scheme such as, but not limited to, resource management schemes used for cache management, for virtual graphics driver technology, as will be described in more detail below. In some examples, resource manager 114 may use a low inter-reference recency set (LIRS) resource management scheme. In some examples, resource manager may use LIRS based CPU usage tracking. In some examples, resource manager may use LIRS based memory usage tracking. In some examples, resource manager 114 may use a least recently used (LRU) resource management scheme. In some examples, resource manager 114 may determine if the detected change in the consumption rate substantially meets a predetermined threshold, and if so, may migrate one or more VMs 110 (i.e., migrate consumption of cloud resources to alternate cloud resources for one or more VMs 110). As a result, resource manager 114 may facilitate improvement of optimization of cloud resources 108.

Figure 2A:
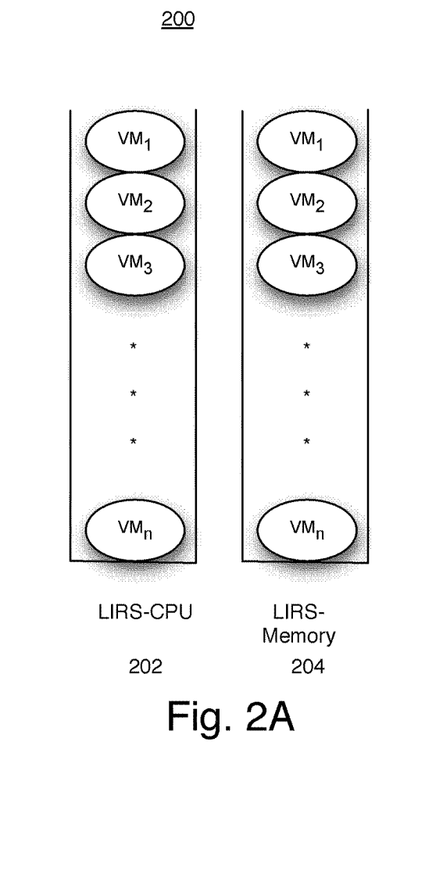
FIGS. 2A-2C illustrate an example method for managing resources in a cloud computing environment using a first resource management scheme.
Figure 2B:
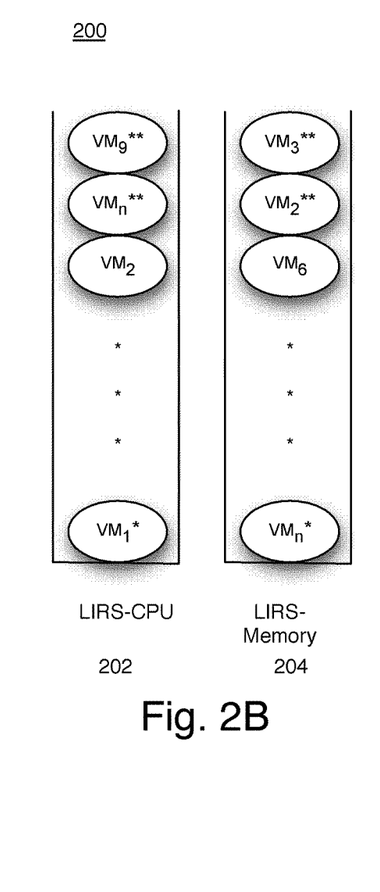
Figure 2C:
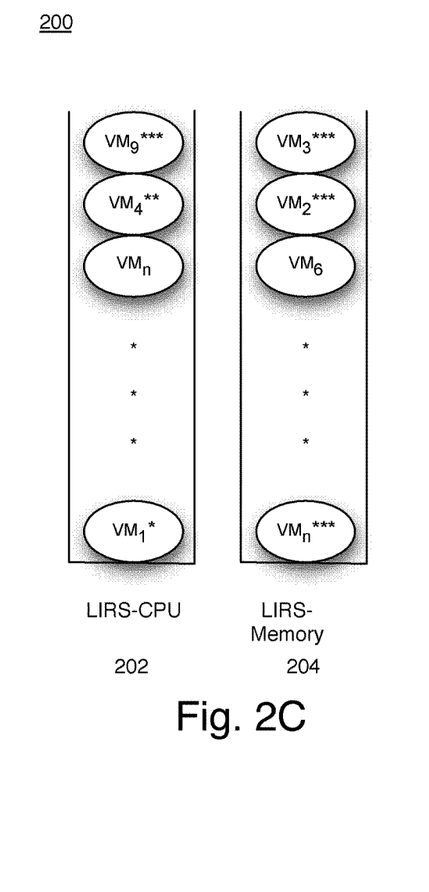

Before going on to describe FIGS. 2A-2C, for ease of understanding, an analogy to virtual graphics driver technology may be used to describe the disclosed subject matter. For example, virtual graphics driver technology may provide information such as, but not limited to, "change regions" (i.e., changed regions within graphics cards), which in turn, may provide information relative to a response time. For example, if a change region is determined to be relatively large, displays generated by a graphics card may be rapidly changing, where a response time may be affected by bandwidth. An example may be if a user is playing a game or watching a video, a response time of a graphics card may be important, while on the other hand, if a user is word processing or programming, a response time of a graphics card may be less important. Along these lines, input/output (I/O) access rates may be used to determine bandwidth demand during execution of a program. For purposes of describing the disclosed subject matter, I/O access rate for within a cloud may be used (i.e., a data source for execution of the program being within the cloud).

FIGS. 2A-2C illustrate an example method 200 for managing resources in a cloud computing environment using a first resource management scheme. Briefly referring back to FIG. 1, as a non-limiting example, an assumption may be made that one or more VMs 110 may be executing programs such that one or more client devices 104 may be serviced by cloud 102. As previously described, one or more VMs 110 may be vying for cloud resources 108. In some examples, one or more VMs 110 may be vying for processor resources 112 and/or memory resources 116. Resource manager 114 may facilitate prioritization of one or more VMs 110, in accordance with various examples. If resource manager 114 determines that certain threshold is met by a consumption rate of cloud resources, resource manager 114 may migrate one or more VMs 110 (i.e., migrated one or more VMs may consume outside resources 106). Turning now to FIGS. 2A-2C, resource manager 114 may use two different resource management schemes to prioritize and migrate, in accordance with various examples.

In FIGS. 2A-2C, method 200 may be described graphically using stacks 202 and 204, which may represent queues. In some examples, method 200 may be implemented in resource manager 114 (FIG. 1), as previously described. In some examples, method 200 may illustrate use of LIRS resource management scheme for prioritization of a number of VMs ($VM_1$-$VM_n$). Method 200 may include LIRS based CPU usage tracking and/or LIRS based memory usage tracking, and accordingly, LIRS based CPU usage tracking may correspond to LIRS-CPU queue 202, while LIRS based memory usage tracking may correspond to LIRS-Memory queue 204. LIRS-CPU queue 202 may include a record for CPU usage by $VM_1$-$VM_n$. LIRS-Memory queue 204 may include memory usage for $VM_1$-$VM_n$.

In FIG. 2A, as usage of cloud resources by $VM_1$-$VM_n$ may be monitored, a consumption rate of cloud resources may be such that $VM_1$-$VM_n$ may not be prioritized (i.e., enough resources to meet the demands by VMs executing various programs within the cloud). As a result, $VM_1$-$VM_n$ in LIRS-CPU queue 202 and LIRS-Memory queue 204 may not be prioritized.

Moving on to FIG. 2B, a consumption rate of cloud resources by $VM_1$-$VM_n$ may be determined, which may include CPU consumption rate, memory consumption rate, I/O access rate, and/or change region size. Based, at least in part, on the determined consumption rate, $VM_1$-$VM_n$ may be prioritized as shown. In some examples, consumption rate of cloud resources may be determined using the following relationship: a threshold of I/O access rate may be designated as "P" and a change region size threshold may be designated "Q". Using this relationship, for a given VM, if I/O access rate is greater than P and/or change region size is larger than Q, a given VM may be prioritized to not be migrated. In FIG. 2B, this prioritization may be shown as VMs marked with a single asterisk ($VM_1$* in LIRS-CPU queue 202 and $VM_n$* in LIRS-Memory queue 204). Additionally, LIRS-length for LIRS-CPU queue 202 and LIRS-Memory queue 204 may be defined as "2" and may be shown as VMs marked with two asterisks ($VM_9$ and $VM_n$ in LIRS-CPU queue 202 and $VM_3$ and $VM_2$ in LIRS-Memory queue 204). Accordingly, $VM_9$ and $VM_n$ may have relatively high consumption rates for cloud resources such as CPU, while $VM_3$ and $VM_2$ may have relatively high consumption rates for cloud resources such as memory.

As usage of cloud resources by $VM_1$-$VM_n$ may continue to be monitored, a change in the consumption rate may be detected by resource manager 114 (in FIG. 1). The detected change may be such that $VM_9$, $VM_3$, and $VM_2$ continue to have relatively high consumption rates of cloud resources (i.e., continue to occupy top positions of their respective LIRS queues 202 and 204), while cloud resources may be reaching maximum capacity for utilization of allowed resources. Accordingly, in FIG. 2C, $VM_9$, $VM_3$, and $VM_2$ may be marked with three asterisks ($VM_9$* in LIRS-CPU queue 202 and $VM_3$* and $VM_2$* in LIRS-Memory queue 204). Additionally, a $VM_4$ may have increased consumption of CPU resources (shown as $VM_4$ in LIRS-CPU queue 202), while $VM_n$ may have decreased consumption of CPU resources (shown as $VM_n$ in LIRS-CPU queue 202). Because $VM_9$, $VM_4$, $VM_3$, and $VM_2$ may have relatively high consumption rates, resource manager 114 may use a second resource management for prioritizing $VM_9$, $VM_4$, $VM_3$, and $VM_2$ including determining whether one or more of $VM_9$, $VM_4$, $VM_3$, and $VM_2$ may be migrated (use outside resources 106 shown in FIG. 1).

Figure 3A:
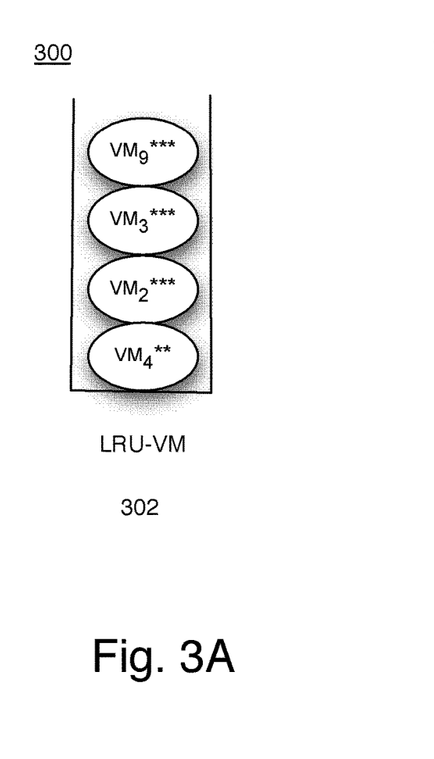
FIGS. 3A-3B illustrate an example method for managing resources in a cloud computing environment using a second resource management scheme.

FIGS. 3A and 3B illustrate prioritizing VMs for consumption of cloud resources using a second resource management scheme 300, in accordance with various embodiments disclosed herein. Method 300 may be described graphically using stack 302, which may represent a queue similar to above with respect to FIGS. 2A-2C. In some examples, method 300 may be implemented in resource manager 114 (FIG. 1), as previously described. In some examples, method 300 may use LRU resource management scheme for prioritization of a number of VMs subsequent to using first resource management scheme 200 (FIGS. 2A-2C). Method 300 may include LRU based VM usage, and accordingly, LRU based VM usage tracking may correspond to LRU-VM queue 302. As previously described, as cloud resources begins to reach maximum capacity or utilization of cloud resources, $VM_9$, $VM_4$, $VM_3$, and $VM_2$ may be prioritized in LRU-VM queue 302, where $VM_4$ may occupy the bottom, $VM_2$* second from the bottom, $VM_3$* third from the bottom, and $VM_9$* at the top. The order may correspond to priority from FIG. 2C, where $VM_9$* may occupy the top of LIRS-CPU queue 202 and $VM_4$ second from the top of LIRS-CPU queue 202, while $VM_3$* may occupy the top of LIRS-Memory queue 204 and $VM_2$* second from the top of LIRS-Memory queue 204.

In some examples, second resource management scheme may include application of a relationship between I/O access rate and change region size. In some examples, relationship may be described as the following equation:

$$R = a*O + b*C \quad \text{(Equation 1)}$$

where O may be I/O access rate, C may be change region size, and a and b may be coefficients.

Figure 3B:
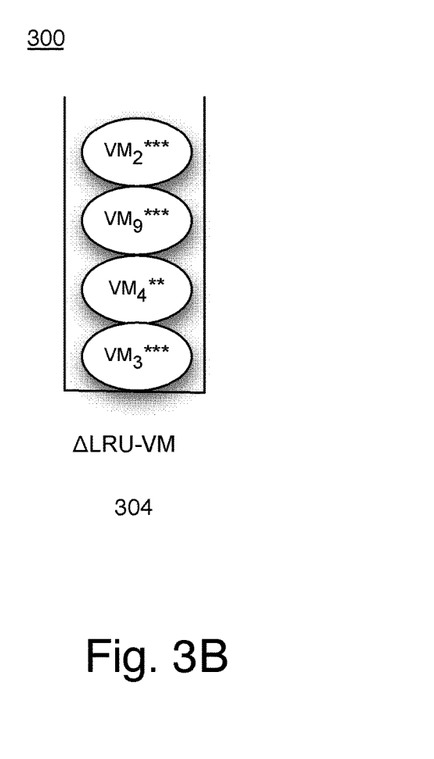

Application of above relationship on VMs in FIG. 3A may result in ΔLRU-VM queue 304 shown in FIG. 3B, where $VM_3$* may occupy the bottom, $VM_4$ second from the bottom, $VM_9$* third from the bottom, and $VM_2$* at the top. Accordingly, resource manager 114 may prioritize $VM_2$* to be migrated ahead of $VM_9$*, $VM_4$, and $VM_3$*, respectively. As a result, VMs, which consume most cloud resources, may be migrated (use outside resources 106 shown in FIG. 1) with minimal effect on cloud services and/or on one or more client devices 104 (i.e., may be ultimately one or more users).

Figure 4:
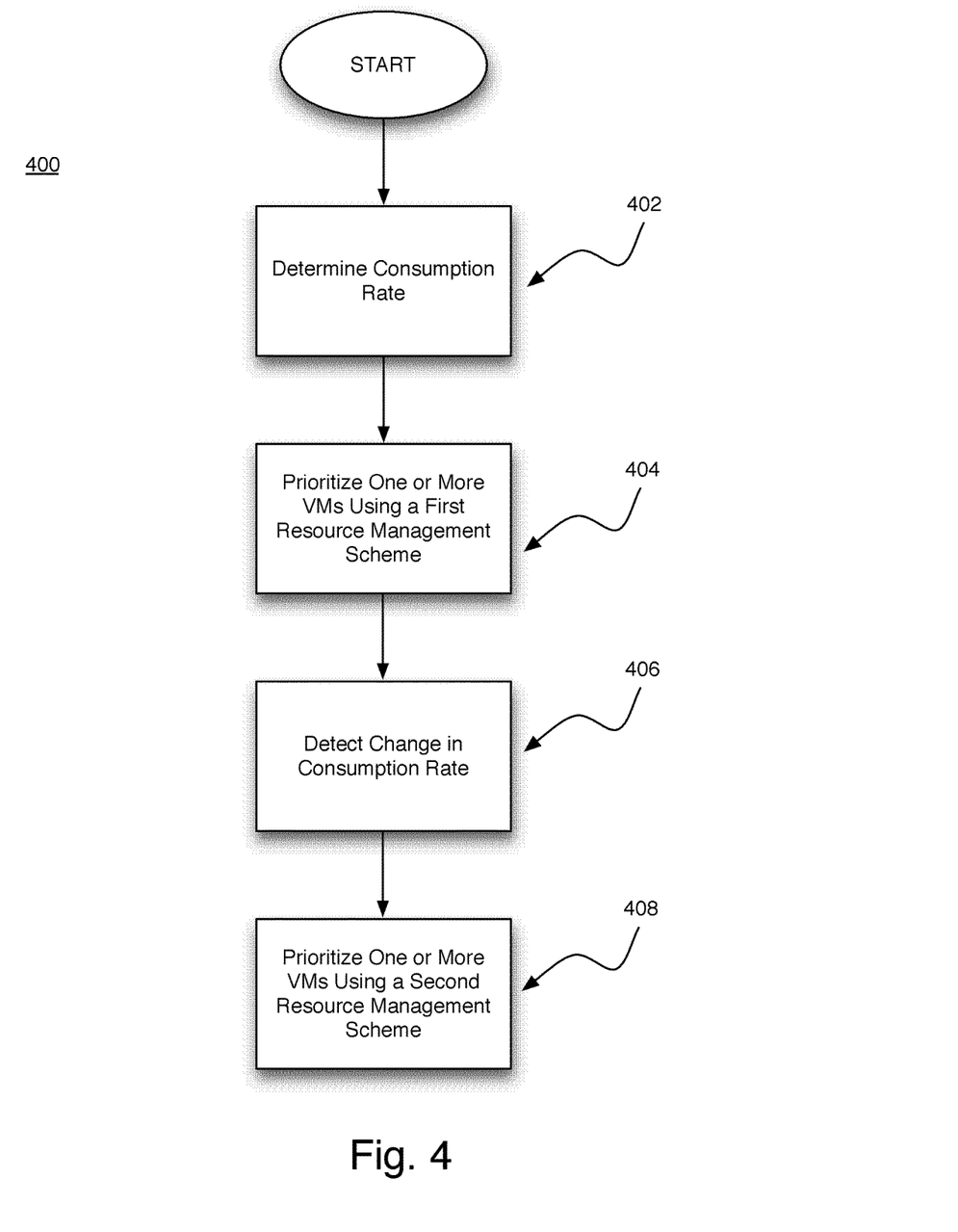
FIG. 4 illustrates a flow diagram of an example method for managing resources in a cloud computing environment.

FIG. 4 illustrates a flow diagram of an example method 400 for providing management of cloud resources, arranged in accordance with at least some embodiments of the present disclosure. In general, method 400 may be performed by any suitable device, devices, or systems such as those discussed herein. In some examples, a cloud may perform method 400. In some examples, one or more cloud resource manager may perform method 400. In some examples, method 400 may be performed by a virtual machine. In some examples, method 400 may be performed by a third party resource such as a third party computing device, or the like.

Method 400 sets forth various functional blocks or actions that may be described as processing steps, functional operations, events and/or acts, etc., which may be performed by hardware, software, and/or firmware. Numerous alternatives to the functional blocks shown in FIG. 4 may be practiced in various implementations. For example, intervening actions not shown and/or additional actions not shown may be employed and/or some of the actions shown may be eliminated, without departing from the scope of claimed subject matter. Method 400 may include one or more of functional operations as indicated by one or more of blocks 402, 404, 406, and/or 408. The process of method 400 may begin at block 402.

At block 402, "Determine Consumption Rate", a consumption rate of cloud resources by one or more VMs may be determined. In general, consumption rate of cloud resources by one more VMs may be determined using any suitable technique or techniques. In some examples, consumption rate of cloud resources may be determined by monitoring at least one of processor usage 112, memory usage 116, or input/output (I/O) access rates, as is discussed further with respect to FIG. 1 and elsewhere herein. In some examples, consumption rate of cloud resources may be determined by change region size, as is discussed further with respect to FIGS. 2A-2C and elsewhere herein. In general, monitoring may be done by any type of monitoring resource associated with cloud environments. In some examples, monitoring may be done by a cloud resource manager, as described in FIG. 1 and elsewhere herein. Process of method 400 may continue from block 402 to block 404.

At block 404, "Prioritize One or More VMs Using a First Resource Management Scheme", one or more VMs may be prioritized for consumption of cloud resources using a first resource management scheme. In general, first resource management scheme may be any resource management scheme such as, but not limited to, resource management schemes used for cache management, for virtual graphics driver technology, and so forth, as discussed with respect to FIGS. 2A-2C. In some examples, first resource management scheme may be a low inter-reference recency set (LIRS) resource management scheme. In some examples, resource manager may use LIRS based CPU usage tracking. In some examples, resource manager may use LIRS based memory usage tracking. Process of method 400 may continue from block 404 to block 406.

At block 406, "Detect Change In Consumption Rate", a change in the consumption rate of cloud resources may be detected. In general, change in the consumption rate may be detected using any number of techniques for monitoring cloud resource consumption. In some examples, a change in the consumption rate may be detected by resource manager 114 (in FIG. 1) periodically and/or randomly (i.e., monitored periodically and/or randomly), as discussed in with respect to FIGS. 2A-2C and elsewhere herein. In some examples, monitoring may occur in response to a change in consumption rate of cloud resources. Process of method 400 may continue from block 406 to block 408.

At block 408, "Prioritize One or More VMs Using a Second Resource Management Scheme", one or more VMs may be prioritized for consumption of cloud resources using a second resource management scheme based, at least in part, on a detected change in consumption rate of cloud resources. In general, second resource management scheme may be any resource management scheme such as, but not limited to, resource management schemes used for cache management, for virtual graphics driver technology, and so forth, as discussed with respect to FIGS. 2A-2C and elsewhere herein. In some examples, a resource manager may use the second resource management scheme, as previously described with respect to FIG. 1. In some examples, resource manager 114 may use a least recently used (LRU) resource management scheme, as further described with respect to FIGS. 3A and 3B and elsewhere herein. In some examples, second resource management scheme may include application of a relationship between I/O access rate and change region size. In some examples, relationship may be described as the following equation:

$$R=a*O+b*C \qquad \text{(Equation 1)}$$

where O may be I/O access rate, C may be change region size, and a and b may be coefficients. As a result, cloud resources may be managed with minimal effect on cloud services and/or on client devices.

Figure 5:
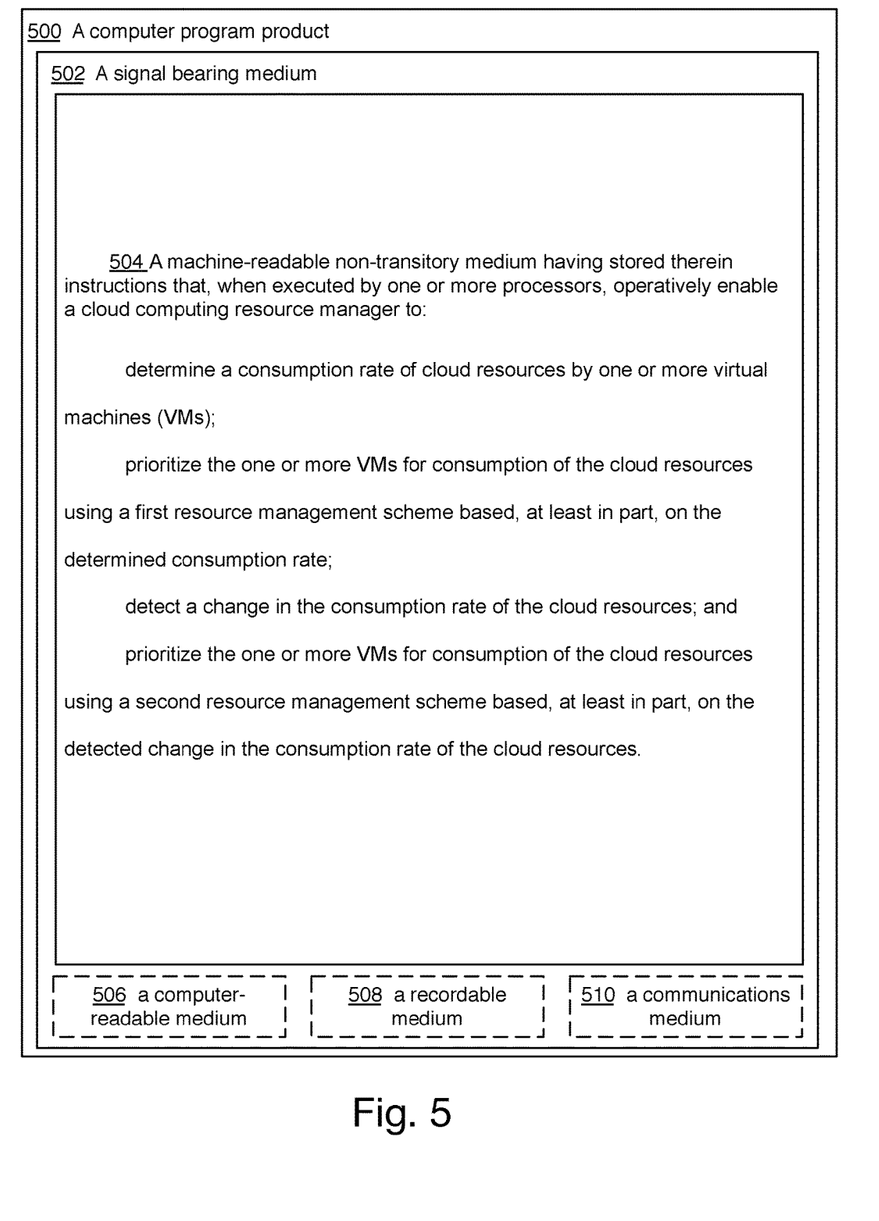
FIG. 5 illustrates an example computer program product.

FIG. 5 illustrates an example computer program product 500, arranged in accordance with at least some embodiments of the present disclosure. Computer program product 500 may include machine readable non-transitory medium having stored therein instructions that, when executed, cause the machine to manage cloud resources in a cloud computer environment according to the processes and methods discussed herein. Computer program product 500 may include a signal bearing medium 502. Signal bearing medium 502 may include one or more machine-readable instructions 504, which, when executed by one or more processors, may operatively enable a computing device to provide the functionality described herein. In various examples, some or all of the machine-readable instructions may be used by the devices discussed herein.

In some examples, the machine readable instructions 504 may include instructions that, when executed, may operatively enable a cloud computing resource manager to determine a consumption rate of cloud resources by one or more VMs. In some examples, the machine readable instructions 504 may include instructions that, when executed, may operatively enable a cloud computing resource manager to prioritize one or more VMs for consumption of cloud resources using a first resource management scheme based, at least in part, on the determined consumption rate. In some examples, the machine readable instructions 504 may include instructions that, when executed, may operatively enable a cloud computing resource manager to detect a change in consumption rate of cloud resources. In some examples, the machine readable instructions 504 may include instructions that, when executed, may operatively enable a cloud computing resource manager to prioritize one or more VMs for consumption of cloud resources using a second resource management scheme based, at least in part, on the detected change in consumption rate of cloud resources.

In some implementations, signal bearing medium 502 may encompass a computer-readable medium 506, such as, but not limited to, a hard disk drive (HDD), a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). In some examples, signal bearing medium 502 may encompass a machine readable non-transitory medium.

Figure 6:
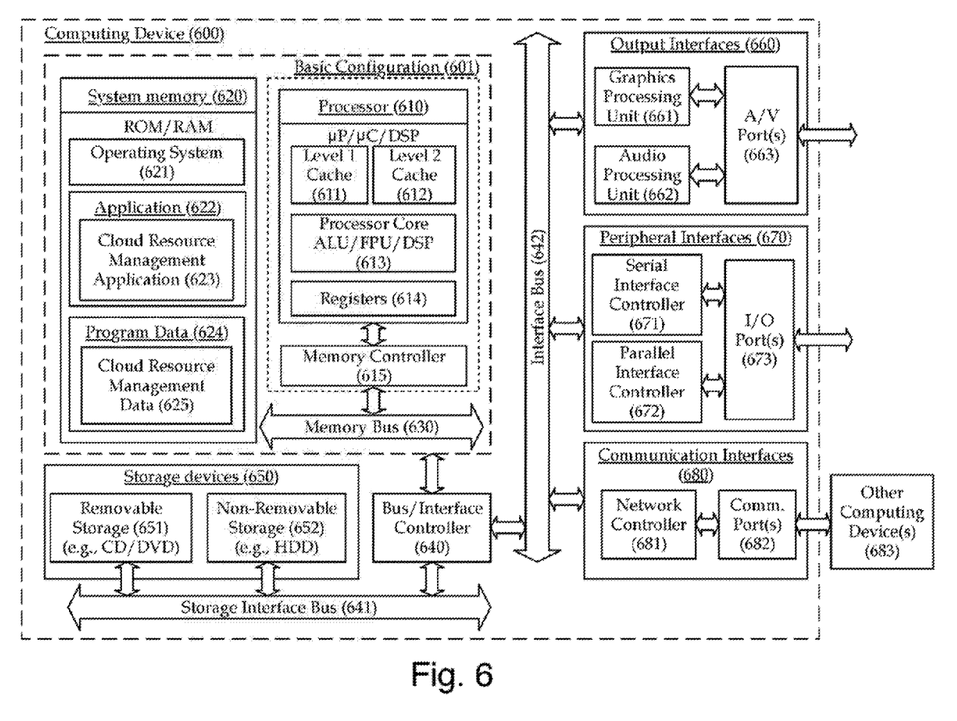
FIG. 6 illustrates of a block diagram of an example computing device, all arranged in accordance with at least some embodiments of the present disclosure.

FIG. 6 is a block diagram illustrating an example computing device 600, arranged in accordance with at least some embodiments of the present disclosure. In various examples, computing device 600 may be configured to manage cloud resources as discussed herein. In one example basic configuration 601, computing device 600 may include one or more processors 610 and system memory 620. A memory bus 630 can be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include cloud resource management application 623 that can be arranged to perform the functions, actions, and/or operations as described herein including the functional blocks, actions, and/or operations described herein. Program Data 624 may include cloud resource management data 625 for use with cloud resource management application 623. In some example embodiments, application 622 may be arranged to operate with program data 624 on an operating system 621. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 683 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claimed subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to manage resources in a cloud computing environment, comprising:
   determining a consumption rate of cloud resources by one or more virtual machines (VMs), the determining based on monitoring at least one of processor usage, memory usage, or input/output (I/O) access rates for the one or more virtual machines in the cloud computing environment;
   prioritizing the one or more VMs for consumption of the cloud resources using a first resource management scheme based, at least in part, on the determined consumption rate;
   determining whether a change in the consumption rate of the cloud resources exceeds a predetermined threshold, the change in the consumption rate including a change in the at least one of processor usage, memory usage, I/O access rates, or a change region size based on changed regions of a graphical display generated by the one or more VMs;

prioritizing the one or more VMs for consumption of the cloud resources using a second resource management scheme based, at least in part, on a maximum capacity for utilization of allowed cloud resources for the cloud computing environment and whether the determined change in the consumption rate of the cloud resources exceeds the predetermined threshold; and migrating the consumption of the cloud resources to alternate cloud resources located outside of the cloud computing environment for at least one of the one or more VMs based, at least in part, on the one or more VMs prioritized for consumption of the cloud resources using the second resource management scheme.

2. The method of claim 1, wherein prioritizing the one or more VMs for consumption of the cloud resources using the first resource management scheme comprises prioritizing the one or more VMs for consumption of the cloud resources using a low inter-reference recency set (LIRS) replacement scheme.

3. The method of claim 2, wherein prioritizing the one or more VMs for consumption of the cloud resources using the LIRS replacement scheme comprises using LIRS based processor usage tracking.

4. The method of claim 2, wherein prioritizing the one or more VMs for consumption of the cloud resources using the LIRS replacement scheme comprises using LIRS based memory usage tracking.

5. The method of claim 1, wherein the alternate cloud resources include one or more of resources included in public cloud, resources included in community cloud, resources included in private cloud, resources included in hybrid cloud, Internet resources, or resources included in virtual private networks (VPNs).

6. The method of claim 1, wherein prioritizing the one or more VMs for consumption of the cloud resources using the second resource management scheme comprises prioritizing the one or more VMs for consumption of the cloud resources using least recently used (LRU) replacement scheme.

7. A machine-readable non-transitory medium having stored therein instructions that, when executed by one or more processors, operatively enable a cloud computing resource manager to:

determine a consumption rate of cloud resources by one or more virtual machines (VMs), the determining based on monitoring at least one of processor usage, memory usage, or I/O access rates for the one or more virtual machines in a cloud computing environment;

prioritize the one or more VMs for consumption of the cloud resources using a first resource management scheme based, at least in part, on the determined consumption rate;

determine whether a change in the consumption rate of the cloud resources exceeds a predetermined threshold, the change in the consumption rate includes a change in the at least one of processor usage, memory usage, input/output (I/O) access rates, or a change region size based on changed regions of a graphical display generated by the one or more VMs;

prioritize the one or more VMs for consumption of the cloud resources using a second resource management scheme based, at least in part, on a maximum capacity for utilization of allowed cloud resources for the cloud computing environment and whether the determined change in the consumption rate of the cloud resources exceeds the predetermined threshold; and migrate the consumption of the cloud resources to alternate cloud resources located outside of the cloud computing environment for at least one of the one or more VMs based, at least in part, on the one or more VMs prioritized for consumption of the cloud resources using the second resource management scheme.

8. The machine-readable non-transitory medium of claim 7, wherein the stored instructions, that when executed by one or more processors, further operatively enable the cloud computing resource manager to prioritize the one or more VMs for consumption of the cloud resources using a low inter-reference recency set (LIRS) replacement scheme.

9. The machine-readable non-transitory medium of claim 8, wherein the stored instructions, that when executed by one or more processors, further operatively enable the cloud computing resource manager to use LIRS based processor usage tracking.

10. The machine-readable non-transitory medium of claim 8, wherein the stored instructions, that when executed by one or more processors, further operatively enable the cloud computing resource manager to use LIRS based memory usage tracking.

11. The machine-readable non-transitory medium of claim 7, wherein the alternate cloud resources include one or more of resources included in public cloud, resources included in community cloud, resources included in private cloud, resources included in hybrid cloud, Internet resources, or resources included in virtual private networks (VPNs).

12. The machine-readable non-transitory medium of claim 7, wherein the stored instructions, that when executed by one or more processors, further operatively enable the cloud computing resource manager to prioritize the one or more VMs for consumption of the cloud resources using least recently used (LRU) replacement scheme.

13. A system to manage migration of resources in a cloud computing environment, comprising:

a processor;

a cloud computing resource manager communicatively coupled to the processor; and a machine-readable non-transitory medium having stored therein instructions that, when executed by processor, operatively enable the cloud computing resource manager to:

monitor a consumption rate of cloud resources, by one or more virtual machines (VMs), the consumption rate for the one or more virtual machines including at least one of a CPU consumption rate, a memory consumption rate, an I/O access rate, or a change region size determined according to changed regions of a graphical display generated by the one or more VMs, prioritize the one or more VMs for consumption of the cloud resources using a first resource management scheme based, at least in part, on the determined consumption rate, determine whether a change in the consumption rate of the cloud resources exceeds a predetermined threshold, the change in the consumption rate including a change in the at least one of processor usage, memory usage, I/O access rates, and a change region size based on changed regions of a graphical display generated by the one or more VMs;

prioritize the one or more VMs for consumption of the cloud resources using a second resource management scheme based, at least in part, on a maximum capacity for utilization of allowed cloud resources for the cloud computing environment and whether the determined change in the consumption rate of the cloud resources exceeds the predetermined threshold; and migrate the consumption of the cloud resources to alternate cloud resources located outside of the cloud computing environment for at least one of the one or more VMs based, at least in part, on the one or more VMs prioritized for consumption of the cloud resources using the second resource management scheme.

14. The system of claim 13, wherein the stored instructions, that when executed by the processor, further operatively enable the cloud computing resource manager to prioritize the one or more VMs for consumption of the cloud resources using a low inter-reference recency set (LIRS) replacement scheme.

15. The system of claim 14, wherein the stored instructions, that when executed by the processor, further operatively enable the cloud computing resource manager to use LIRS based processor usage tracking.

16. The system of claim 14, wherein the stored instructions, that when executed by the processor, further operatively enable the cloud computing resource manager to use LIRS based memory usage tracking.

17. The system of claim 13, wherein the alternate cloud resources include one or more of resources included in public cloud, resources included in community cloud, resources included in private cloud, resources included in hybrid cloud, Internet resources, or resources included in virtual private networks (VPNs).

18. The system of claim 13, wherein the stored instructions, that when executed by the processor, further operatively enable the cloud computing resource manager to prioritize the one or more VMs for consumption of the cloud resources using least recently used (LRU) replacement scheme.

* * * * *